US007650633B2

(12) United States Patent
Whitson

(10) Patent No.: US 7,650,633 B2
(45) Date of Patent: Jan. 19, 2010

(54) AUTOMATED ORGANIZATIONAL ROLE MODELING FOR ROLE BASED ACCESS CONTROLS

(75) Inventor: John Whitson, Waltham, MA (US)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 11/619,918

(22) Filed: Jan. 4, 2007

(65) Prior Publication Data

US 2008/0168063 A1  Jul. 10, 2008

(51) Int. Cl.
G06F 17/30 (2006.01)
(52) U.S. Cl. ............................. 726/6; 726/28; 726/18; 707/9; 709/229
(58) Field of Classification Search ................ 726/2–7, 726/16–18, 26–28; 707/1, 9; 709/227, 229
See application file for complete search history.

(56) References Cited

U.S. PATENT DOCUMENTS

| 6,014,666 | A | 1/2000 | Helland et al. |
| 6,574,736 | B1 | 6/2003 | Andrews |
| 6,917,975 | B2 | 7/2005 | Griffin et al. |
| 7,032,006 | B2 | 4/2006 | Zhuk |
| 7,254,489 | B2 * | 8/2007 | Mossel ........................ 702/19 |
| 2003/0229623 | A1 | 12/2003 | Chang et al. |
| 2005/0138420 | A1 * | 6/2005 | Sampathkumar et al. .... 713/201 |

OTHER PUBLICATIONS

Oh, S., "Enterprise Model as a Basis of Administration on Role-Based Access Control", Proc. of third International Symposium on Cooperative Database Systems for Advanced Applications, 2001.*
Barkley, J., Beznosov, K., and Uppal, J. Supporting relationships in access control using role based access control. In Proceedings of the Fourth ACM Workshop on Role-Based Access Control, 1999.*
R. Sandhu, Q. Munawer, "The RRA97 Model for Role-Based Administration of Role Hierarchies," acsac, pp. 39, 14th Annual Computer Security Applications Conference (ACSAC '98), 1998.*
Sandhu, R.S.; Coyne, E.J.; Feinstein, H.L.; Youman, C.E., "Role-based access control models," Computer, vol. 29, No. 2, pp. 38-47, Feb. 1996.*

* cited by examiner

Primary Examiner—Vu Le
Assistant Examiner—Alexander Lagor
(74) Attorney, Agent, or Firm—William H. Steinberg; Schubert Osterrieder & Nickelson PLLC

(57) ABSTRACT

Generally speaking, systems, methods and media for automatically generating a role based access control model (RBAC) for an organizational environment with a role based access control system such as a hierarchical RBAC (HRBAC) system are disclosed. Embodiments may include a method for generating an RBAC model. Embodiments of the method may include accessing existing permissions granted to users of an organizational environment and analyzing the permissions to create permission characteristics. Embodiments of the method may also include performing cladistics analysis on the permission characteristics to determine role perspective relationships between individual users of the organizational environment. Embodiments of the method may also include generating an RBAC model based on the determined role perspective relationships between individual users of the organizational environment. Further embodiments of the method may include where generating the RBAC model includes generating a cladogram based on the determined role perspective relationships.

20 Claims, 6 Drawing Sheets

AUTOMATED ORGANIZATIONAL ROLE MODELING FOR ROLE BASED ACCESS CONTROLS

FIELD OF INVENTION

The present invention is in the field of data processing systems and, in particular, to systems, methods and media for modeling organizational roles for developing a role based access control system to authorize access to resources or to perform an operation on resources.

BACKGROUND

Computer systems are well known in the art and have attained widespread use for providing computer power to many segments of today's modern society. Computer systems such as personal computers (PCs) and servers may typically include a system unit having a central processing unit (CPU) and associated volatile and non-volatile memory, including random access memory (RAM) and basic input/output system read only memory (BIOS ROM), a system monitor, a CD-ROM or DVD-ROM drive, a data storage device (often a non-removable disk drive, also known as a "hard drive"), user input devices, and a network interface adapter. Computers systems typically include software such as computer programs in addition to the hardware. As advances in semiconductor processing and computer architecture continue to push the performance of computer hardware higher, more sophisticated computer software has evolved to take advantage of the higher performance of the hardware, resulting in computer systems that continue to increase in complexity and power.

Computer systems have thus evolved into extremely sophisticated devices that may be found in many different settings. Many organizations utilize server computer systems for more complicated tasks such as providing e-commerce websites, providing complex multi-user applications, maintaining large databases, or performing other resource-intensive tasks. Organizations with significant computing needs often have many servers performing a wide variety of tasks with the servers communicating with each other via a network such as a local area network (LAN). In these systems, individual users may interact with the servers to access various system resources, such as applications, databases, or other resources, so that the systems resources may be shared by multiple users.

Maintaining information security in a complex computing system is an increasingly complex task as more users and/or resources are added to a system, particularly when those resources are shared by multiple users. Information security provides the ability to restrict access to information or other resources to only those users who should have access to that resource. Modern information security systems often attempt to provide information security by combination of authentication or identity management (i.e., only providing access to the system to the appropriate users) and/or authorization (i.e., only providing access to information to authenticated users who are authorized for that particular information).

Currently, one of the more robust models for developing access controls to implement an authorization scheme is the role based access control (RBAC) model. In the RBAC model, users are assigned sets of zero or more roles which are each defined as zero or more permissions. A permission within the RBAC model consists of an object and an operation that may be performed on, in or with the object. The use of an RBAC model has proven to be effective in managing user privileges within a single system or application. More complicated systems with multiple applications or other more heterogeneous aspects, however, result in development of the RBAC model becoming more unwieldy and requiring significantly more time and effort to create.

The RBAC model has proven less effective for larger, complicated computer systems because defining particular roles—and their permissions—can be labor intensive and difficult. In large organizations, for example, determining roles and defining permissions can be very problematic. Most organizations do not have any individual or group that can clearly and adequately define even their own member roles, much less those of other individuals or groups. Under the current state of the art, role definition typically begins with a complex interview process and is followed by patient, tedious review of large tables of data to determine which permissions should be assigned to each role. In a hierarchical RBAC (HRBAC) where roles inherit permissions of their parents, the project becomes even more daunting as relationships between these roles must be carefully examined for their relationship. These problems can be exacerbated with dynamic organizations as changes to the organizational structure or responsibilities can result in inaccuracies in the RBAC model and thus necessitate additional model revisions. Accordingly, the creation of an HRBAC model of roles and relationships becomes a time-consuming and inefficient process using existing methodologies.

SUMMARY OF THE INVENTION

The problems identified above are in large part addressed by systems, methods and media for automatically generating a role based access control (RBAC) model for an organizational environment having an RBAC system such as a hierarchical RBAC (HRBAC) system. Embodiments may include a method for generating an RBAC model. Embodiments of the method may include accessing existing permissions granted to users of an organizational environment and analyzing the permissions to create permission characteristics. Embodiments of the method may also include performing cladistics analysis on the permission characteristics to determine role perspective relationships between individual users of the organizational environment. Embodiments of the method may also include generating an RBAC model based on the determined role perspective relationships between individual users of the organizational environment. Further embodiments of the method may include where generating the RBAC model includes generating a cladogram based on the determined role perspective relationships.

Another embodiment provides a computer program product comprising a computer-useable medium having a computer readable program wherein the computer readable program, when executed on a computer, causes the computer to perform a series of operations for generating an RBAC model. The series of operations generally includes accessing existing permissions granted to users of an organizational environment and analyzing the permissions to create permission characteristics. Embodiments of the series of operations may also include performing cladistics analysis on the permission characteristics to determine role perspective relationships between individual users of the organizational environment. Embodiments of the series of operations may also include generating an RBAC model based on the determined role perspective relationships between individual users of the organizational environment.

A further embodiment provides a hierarchical role based access control (HRBAC) modeling system. The HRBAC modeling system may include an environment interface module to receive an indication of existing permissions granted to users of an organizational environment and a role mining module for communication with the environment interface module. The role mining module may analyze the permissions to create permission characteristics and may also perform cladistics analysis on the permission characteristics to determine role perspective relationships between individual users of the organizational environment. The HRBAC modeling system may also include a role perspective analyzer module in communication with the role mining module to generate an RBAC model based on the determined role perspective relationships.

Another embodiment provides a method for an HRBAC model service to a client. Embodiments of the method may include receiving an indication of existing permissions granted to users of an organizational environment of the client and analyzing the permissions to create permission characteristics. Embodiments of the method may also include performing cladistics analysis on the permission characteristics and generating an HRBAC model specifying role perspective relationships between individual users of the client organizational environment. Further embodiments of the method may include analyzing the role perspective relationships of the generated HRBAC model to generate an HRBAC model business analysis. Further embodiments of the method may also include performing an ongoing HRBAC model service to the client by receiving updates to permissions granted to users of the client organizational environment and generating revised HRBAC models in response.

BRIEF DESCRIPTION OF THE DRAWINGS

Aspects of certain embodiments of the invention will become apparent upon reading the following detailed description and upon reference to the accompanying drawings in which, like references may indicate similar elements.

DETAILED DESCRIPTION OF EMBODIMENTS

Figure 1:
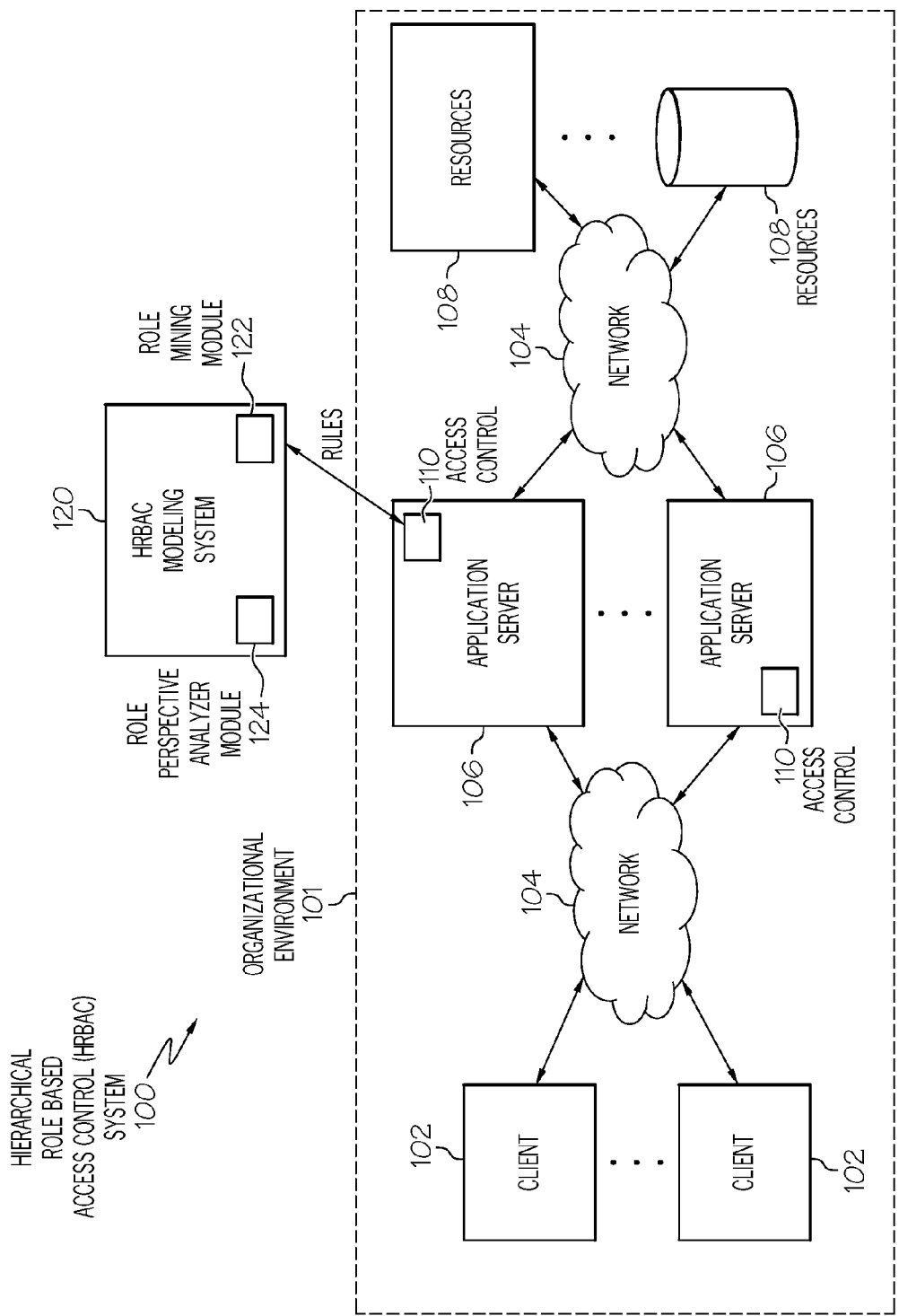
FIG. 1 depicts an environment for a hierarchical role based access control (HRBAC) system with an HRBAC modeling system and an informational technology (IT)-based organizational environment according to some embodiments.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for automatically generating a role based access control model (RBAC) for an organizational environment with a role based access control system such as a hierarchical RBAC (HRBAC) system are disclosed. Embodiments may include a method for generating an RBAC model. Embodiments of the method may include accessing existing permissions granted to users of an organizational environment and analyzing the permissions to create permission characteristics. Embodiments of the method may also include performing cladistics analysis on the permission characteristics to determine role perspective relationships between individual users of the organizational environment. Embodiments of the method may also include generating an RBAC model based on the determined role perspective relationships between individual users of the organizational environment. Further embodiments of the method may include where generating the RBAC model includes generating a cladogram based on the determined role perspective relationships.

The system and methodology of the disclosed embodiments allows for effective and efficient automatic generation of RBAC models for various organizational environments, such as networked computer systems, information systems, security systems, or any business or other organizational system with access controls. The disclosed system utilizes cladistics analysis that is typically used to determine relative relationships in biology and applies this type of analysis (and its existing tools) to role relationships in a computing environment. To do so, the disclosed system may treat permissions granted users of a system as "characteristics" for the purposes of the cladistics analysis. By modifying existing cladistics statistical methodologies and applying them to user permissions, a model of the role perspective relationships may be automatically and efficiently created, eliminating the need to manually interview users and pore over large tables of data to determine which permissions should be applied to each role. The disclosed system may also be useful in providing a RBAC modeling service to statistically create an initial RBAC model for an organizational environment and also optionally to maintain and update the model as users, organizational structures, resources, and responsibilities change over time.

In general, the routines executed to implement the embodiments of the invention, may be part of a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While specific embodiments will be described below with reference to particular configurations of hardware and/or software, those of skill in the art will realize that embodiments of the present invention may advantageously be implemented with other substantially equivalent hardware, software systems, manual operations, or any combination of any or all of these. The invention can take the form of an entirely hardware embodiment, an entirely software embodiment or an embodiment containing both hardware and software elements. In a preferred embodiment, the invention is implemented in software, which includes but it not limited to firmware, resident software, microcode, etc.

Aspects of the invention described herein may be stored or distributed on computer-readable medium as well as distributed electronically over the Internet or over other networks, including wireless networks. Data structures and transmission of data (including wireless transmission) particular to aspects of the invention are also encompassed within the scope of the invention. Furthermore, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk read/write (CD-R/W) and DVD.

Each software program described herein may be operated on any type of data processing system, such as a personal computer, server, etc. A data processing system suitable for storing and/or executing program code may include at least one processor coupled directly or indirectly to memory elements through a system bus. The memory elements may include local memory employed during execution of the program code, bulk storage, and cache memories which provide temporary storage of at least some program code in order to reduce the number of times code must be retrieved from bulk storage during execution. Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices though intervening private or public networks, including wireless networks. Modems, cable modems and Ethernet cards are just a few of the currently available types of network adapters.

Turning now to the drawings, FIG. 1 depicts an environment for a hierarchical role based access control (HRBAC) system with an HRBAC modeling system and an informational technology (IT)-based organizational environment according to some embodiments. In the depicted embodiment, the HRBAC system 100 includes an organizational environment 101 and an HRBAC modeling system 120. As will be described in more detail subsequently, the HRBAC modeling system 120 may statistically generate an RBAC model comprising a plurality of rules using cladistics analysis for use in implementing an RBAC system in the organizational environment 101. The HRBAC modeling system 120 may be in communication with components of the organizational environment 101, such as access control 110, via a network or other means. The HRBAC modeling system 120 may thus provide a generated RBAC model and its constituent rules for use in the access control 110. While the HRBAC modeling system 120 is depicted in FIG. 1 as being separate from the organization environment 101, in other embodiments the HRBAC modeling system 120 may be partially or wholly integrated into the organization environment 101, such as when an organization performs its own RBAC modeling. In the HRBAC system 100, the components may be located at the same location, such as in the same building or computer lab, or could be remote. While the term "remote" is used with reference to the distance between the components of the HRBAC system 100, the term is used in the sense of indicating separation of some sort, rather than in the sense of indicating a large physical distance between the systems. Throughout this disclosure, references to both RBAC and HRBAC systems and one or ordinary skill in the art will recognize that the disclosed invention will apply to any type of RBAC system, including HRBAC system, and the nomenclature is used interchangeably herein unless otherwise specified.

The organizational environment 101 may include one or more computing components representing a computer system with controlled access by users to at least some of its resources. In the organizational environment 101, an RBAC model may define a system that controls and authorizes access by users to perform operations on, in, or with an object. Objects may be any type of resource, such as computer resources (e.g., files, databases, content, pages, etc.) or physical resources (e.g., access to a physical location). Authorization to perform operations relating to an object are typically called permissions, which may consist of an object and an operation that may be performed on, in or with the object. In an RBAC model, users are assigned sets of zero or more roles which are each defined as zero or more permissions, and the access control 110 utilizes these roles to grant or deny permissions to users to perform various tasks.

The organizational environment 101 may be any type of business system or other organizational system for which access controls may be used. In the embodiment of FIG. 1, an IT-based organizational environment 101 that controls access to computer resources is depicted. As will be described in more detail in relation to FIG. 2, other types of organization environments 101 are possible, such as a content distribution system that distributes content based on an individual's roles or a security system which controls access to physical spaces based on a user's roles. In the depicted embodiment, the IT-based organizational environment 101 includes one or more clients 102 in communication with one or more application servers 106 via a network 104. The application servers 106 of the depicted embodiment are also in communication with various resources 108 via network 104. Users may utilize clients 102 to access the resources 108 through the application servers 106 and the application servers 106 may control such access by limiting the resources that a particular user can access as well as the amount of access. While the organizational environment 101 of FIG. 1 depicts an application server-based computing system, one of ordinary skill in the art will recognize that other types of organizational environments 101 are possible, such as those implemented one a single computing platform, on a distributed computing platform, via Web servers, or other types of environments.

Each client 102 may be a personal computer system or other computer system adapted to execute computer programs, such as a personal computer, workstation, server, notebook or laptop computer, desktop computer, personal digital assistant (PDA), mobile phone, wireless device, or set-top box. A user may interact with the client 102 via a user interface to, for example, request access to a resource 108 or to receiving information from a resource 108. Each client 102 may be in communication with network 104 for transmitting and receiving information.

Network 104 may be any type of data communications channel or combination of channels, such as the Internet, an intranet, a LAN, a WAN, an Ethernet network, a wireless network, telephone network, a proprietary network, or a broadband cable network. In one example, a LAN may be particularly useful as a network 104 between the clients 102 and application servers 106 in a corporate environment to facilitate communication within the organization, while in other examples network 104 may connect a client 102 with Web-based resources with the Internet serving as network 104. Those skilled in the art will recognize, however, that the invention described herein may be implemented utilizing any type or combination of data communications channel(s) without departing from the scope and spirit of the invention.

Figure 3:
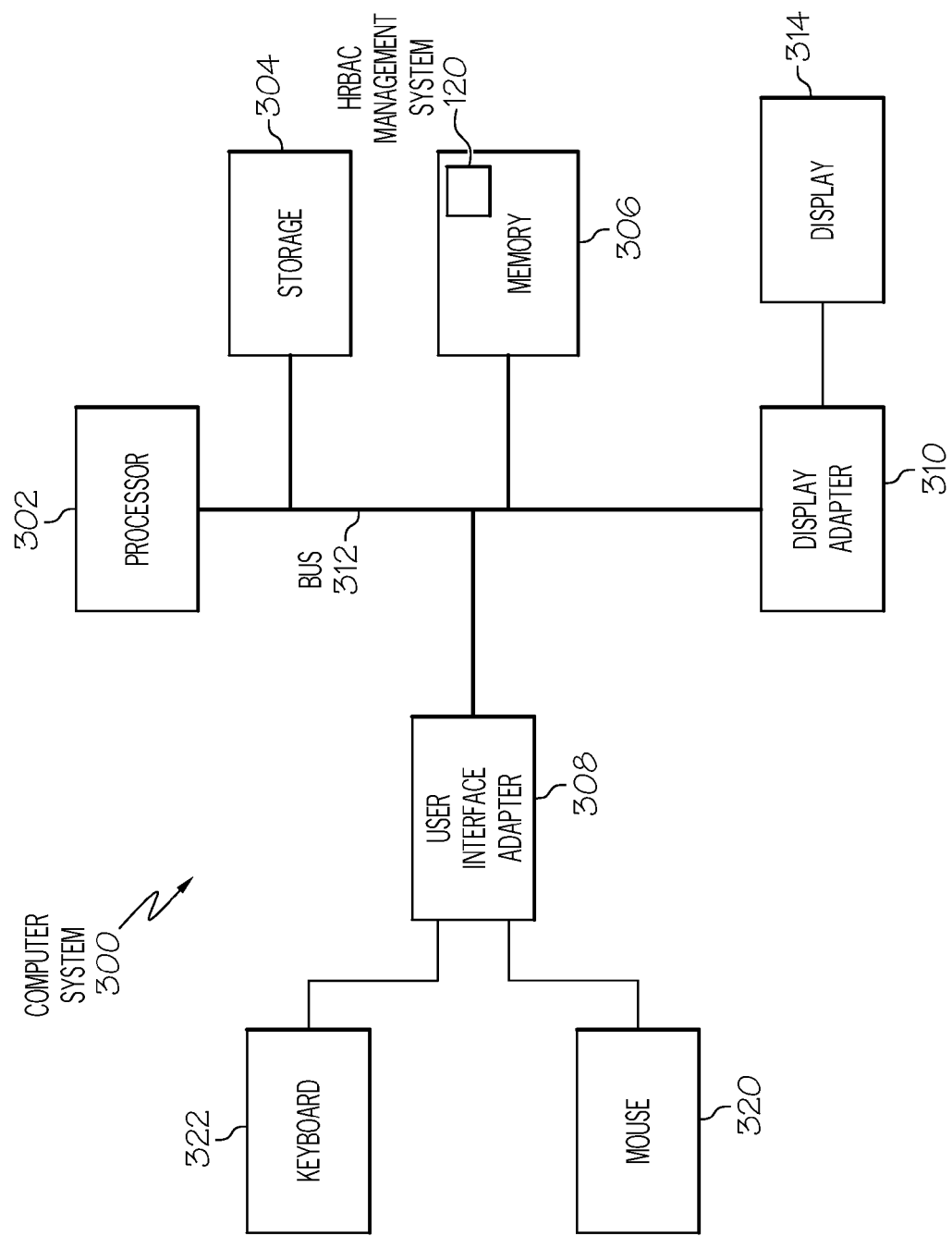
FIG. 3 depicts a block diagram of one embodiment of a computer system suitable for use as a component of the HRBAC system, such as a client, application server, or HRBAC modeling system.

The application servers 106 of the organizational environment 101 may be one or more server computer systems such as an International Business Machine Corporation (IBM) IBM Websphere® application server or other computer system (such as described in relation to FIG. 3). One or more of the application servers 106 may include an access control module 110 to control access of resources by users of the clients 102. The access control module 110 may be an implementation of an RBAC model to restrict system access to computer resources to authorized users. The access control 110 may receive an RBAC model from the HRBAC modeling system 120 and may then use the rules of that RBAC model to implement access controls. RBAC-based security is known in the art and typically operates by defining roles for various job functions in an organization and assigning permissions to perform certain operations to various roles. Users of the system may then be assigned particular roles and through those role assignments the user may acquire the permissions to perform particular system functions. Management of user rights becomes a matter of assigning the appropriate roles to a user instead of having to assign permissions to different objects or information for each individual user. Access control module 110 may implement a hierarchical RBAC (HRBAC) scheme that utilizes role hierarchy where roles inherit the permissions of parental roles. As will be described in more detail subsequently, the access control module 110 may receive a statistically-generated RBAC model from the HRBAC modeling system 120 (either directly or indirectly) and may utilize the received RBAC model to implement RBAC-based security. The functions of access control module 110 may be implemented in an existing access control system such as IBM's IBM Tivoli® Identity Manager in some embodiments and in other embodiments may be implemented as a stand-alone application or wholly or partially integrated with other applications.

Resources 108 may include any type of computing resources for which access may be controlled, including information, databases, files, applications, functions, hardware, websites, pages, or other types of computing resources. Resources 108 may be located on computer systems (such as servers), hard drives, fixed or removable storage, storage area networks, or any other location or device. In some embodiments, resources 108 may be organizational resources 108 within an organizational environment, while in other embodiments resources 108 may be distributed over the Internet or other open network. As will be described in more detail subsequently, resources 108 may also include physical resources such as building, rooms, lockers, or other physical entities for which access may be controlled.

The HRBAC modeling system 120, which will be described in more detail in relation to FIGS. 3-5, may generate an RBAC model (including an HRBAC model) for a particular organizational environment 101 using statistical methods based on cladistics methodologies. The HRBAC modeling system 120 may execute on one or more server computer systems such as an IBM Websphere® application server or other computer system (such as described in relation to FIG. 2). The HRBAC modeling system 120 may include a role mining module 122 to analyze the permissions granted to users in the organizational environment 101 to create permission characteristics. The role mining module 122 may also perform cladistics analysis on the permission characteristics to determine role perspective relationships between individual users of the organizational environment 101, as will be described in more detail subsequently. The HRBAC modeling system 120 may also include a role perspective analyzer module 124 may use the determined role perspective relationships to generate an RBAC model, which may then be provided to the access control module 110 of the organizational environment 101 for use in an RBAC system. The generated RBAC model may be fitted to the current working environment of the organization as it is created from the current user permissions of the organizational environment 101. The use of a cladistics analysis by the role mining module 122 to statistically generate an RBAC model may greatly reduce the time and resources required to determine role perspective relationships and thus a model of the roles in an organization and may largely eliminate the need to manually analyze large tables of data.

The disclosed methodologies for automatically generating an RBAC model provides a useful tool for organizations implementing an RBAC system. Administrators may specify an RBAC policy, a formal global statement of general principles for granting permissions. Elements of this policy may be utilized by the HRBAC modeling system 120 to generate the RBAC model, which itself may be a tool for representing, defining, and developing systems, such as IT systems, content delivery systems, or physical security systems. The generated RBAC model constrains and shapes an implementation within the organizational environment 101. The implementation of the generated RBAC model may be performed by the organizational environment 101 itself as the practical application of a methodology to fulfill a desired purpose of the organizational environment 101.

The systems and methodologies of the disclosed embodiments provide an efficient and effective mechanism for automatically generating an RBAC model using statistical analysis for use in controlling access by users to various resources 108 via an access control module 110. By reducing the time and resources required to develop an RBAC model by using cladistics analysis from the field of biology, the disclosed system provides a more feasible mechanism for generating an RBAC model that is fitted to the current state of an organization. The efficiencies achieved by utilizing cladistics statistical analysis tools may also allow for frequent updating of an RBAC model as the nature of the organization changes, such as when roles are added, removed, or changed in scope. The results of the cladistics analysis may also in some embodiments result in potential insights into the structure of the organization, providing for the ability to notice redundancies in the functions of different roles or other business structural issues.

Figure 2:
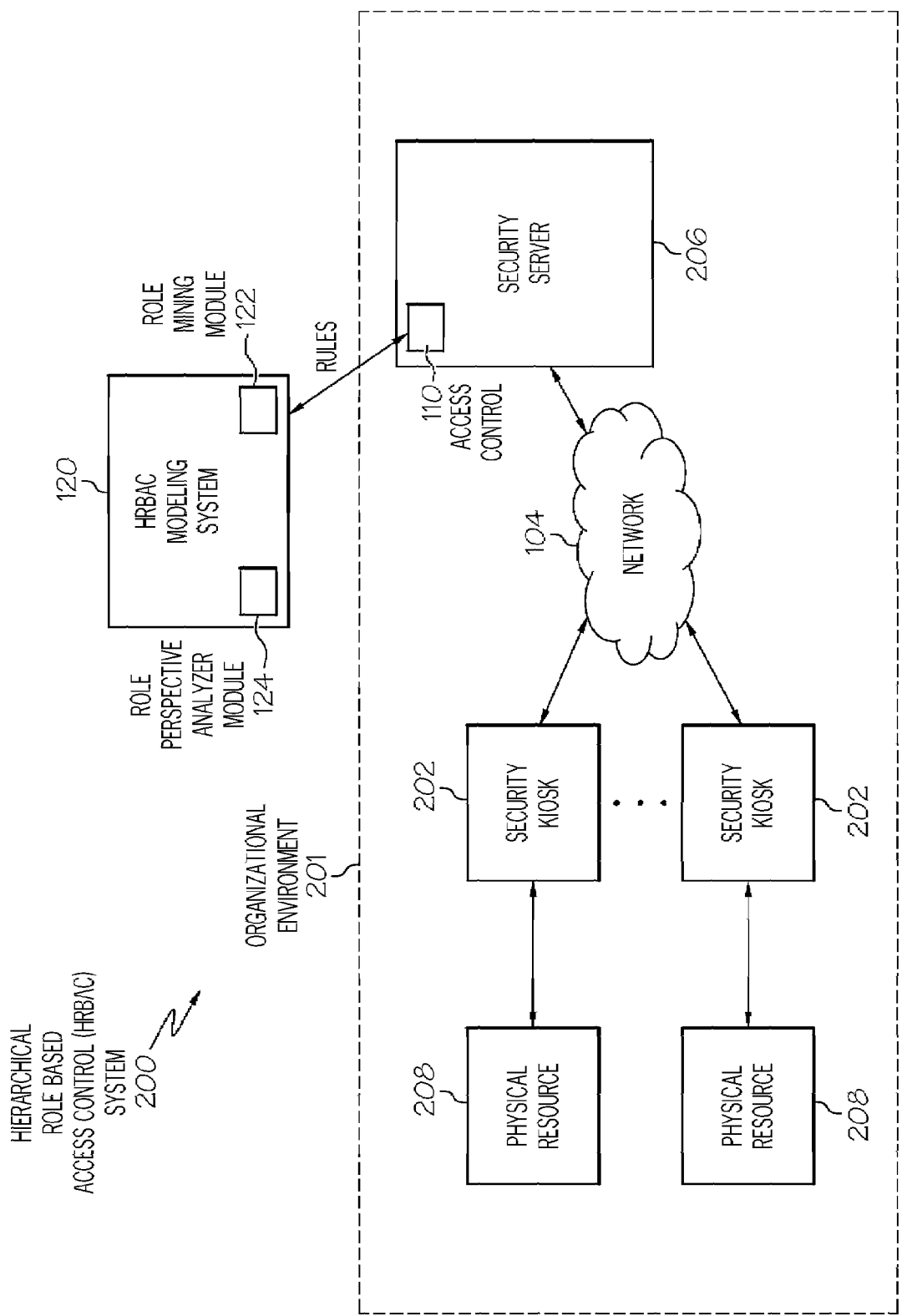
FIG. 2 depicts an environment for an HRBAC system with an HRBAC modeling system and a physical security-based organizational environment according to some embodiments.

FIG. 2 depicts an environment for an HRBAC system with an HRBAC modeling system and a physical security-based organizational environment according to some embodiments. In the depicted embodiment, the HRBAC system 200 includes a physical security-based organizational environment 201 and an HRBAC modeling system 120. The HRBAC system 200 of FIG. 2 depicts an alternative embodiment of the HRBAC system 100 of FIG. 1 and the description of FIG. 1 will not be repeated in the interest of brevity.

The organizational environment 101 of FIG. 2 represents a physical security system such as those that may be used by a security service providing security to a building and rooms within the building. In the physical security-based organizational environment 201, the roles assigned to a user may dictate which physical locations or spaces to which they are granted access. Only users who are assigned a role indicating they belong to a particular department, for example, may be allowed access to a department storeroom via an RBAC access control system. In another example, individuals with an assigned role associated with users with sufficient rank in the organization (e.g., supervisors, colonels, etc.) may be allowed into a particular document room.

In the depicted embodiment, the organizational environment 201 includes a plurality of security kiosks 202 controlling access to associated physical resources 208 based on communications with a security server 206. When a user desires to enter a physical resource 208 (such as a room or building), the user may interact with the security kiosk 202 to provide an indication of their identity (possibly with the help of a security guard), such as by an encoded ID card, RFID-based identifier, retinal or fingerprint scan, or any other type of authentication system. The security kiosk 202 may then communication with the security server 206 (and its access control 110) via network 104 to determine if the user is authorized to have access to the physical resource 208. If the security server 206 (by utilizing its access control 110 system) determines that the user is authorized, it may transmit the authorization to the security kiosk 202, which in turn may allow access to the physical resource 208 by unlocking the door or other means. In this fashion, the security server 206 and its access control 110 system may efficiently utilize the roles defined in the generated RBAC model to control access to various physical resources 208.

In the depicted organizational environment 201, the security server 206 may be one or more server computer systems such as an IBM Websphere® application server or other computer system (such as described in relation to FIG. 3). Security kiosks 202 may be any device adapted to control access to a physical resource 208, such as a card reader, biological reader, wireless receiver, or other device. The physical resources 208 may be any physical objects for which access may be desirably limited, such as rooms, buildings, facilities, lockers, or other objects.

The system of FIG. 2 depicts an embodiment for utilizing the HRBAC modeling system 120 and its capability of automatically generating RBAC models for a particular implementation. As described previously, one of ordinary skill in the art will recognize that the disclosed systems and methodologies for generating RBAC models may also be utilized with other types of implementations or organizational environment, including any implementations for which access to resources may be controlled in any fashion.

FIG. 3 depicts a block diagram of one embodiment of a computer system 300 suitable for use as a component of the HRBAC systems 100, 200, such as a client 102, application server 106, or HRBAC modeling system 120. Other possibilities for the computer system 300 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 300 may be mounted on a multi-layer planar or motherboard (which may itself be mounted on the chassis) to provide a means for electrically interconnecting the components of the computer system 300.

In the depicted embodiment, the computer system 300 includes a processor 302, storage 304, memory 306, a user interface adapter 308, and a display adapter 310 connected to a bus 312 or other interconnect. The bus 312 facilitates communication between the processor 302 and other components of the computer system 300, as well as communication between components. Processor 302 may include one or more system central processing units (CPUs) or processors to execute instructions, such as an IBM® PowerPC™ processor, an Intel Pentium® processor, an Advanced Micro Devices Inc. processor or any other suitable processor. The processor 302 may utilize storage 304, which may be non-volatile storage such as one or more hard drives, tape drives, diskette drives, CD-ROM drive, DVD-ROM drive, or the like. The processor 302 may also be connected to memory 306 via bus 312, such as via a memory controller hub (MCH). System memory 306 may include volatile memory such as random access memory (RAM) or double data rate (DDR) synchronous dynamic random access memory (SDRAM). In the disclosed systems, for example, a processor 302 may execute instructions to perform functions of the role perspective analyzer module 124 or role mining module 122 of the HRBAC modeling system 120, such as generating an RBAC model for an organizational environment 101, and may temporarily or permanently store information during its calculations or results after calculations in storage 304 or memory 306. All of part of the role mining module 122, for example, may be stored in memory 306 during execution of its routines.

The user interface adapter 308 may connect the processor 302 with user interface devices such as a mouse 320 or keyboard 322. The user interface adapter 308 may also connect with other types of user input devices, such as touch pads, touch sensitive screens, electronic pens, microphones, etc. A user of a client 102 requesting permission to access a resource 108 or a consultant generating an RBAC model with an HRBAC modeling system 120, for example, may utilize the keyboard 322 and mouse 320 to interact with the computer systems. The bus 312 may also connect the processor 302 to a display, such as an LCD display or CRT monitor, via the display adapter 310.

Figure 4:
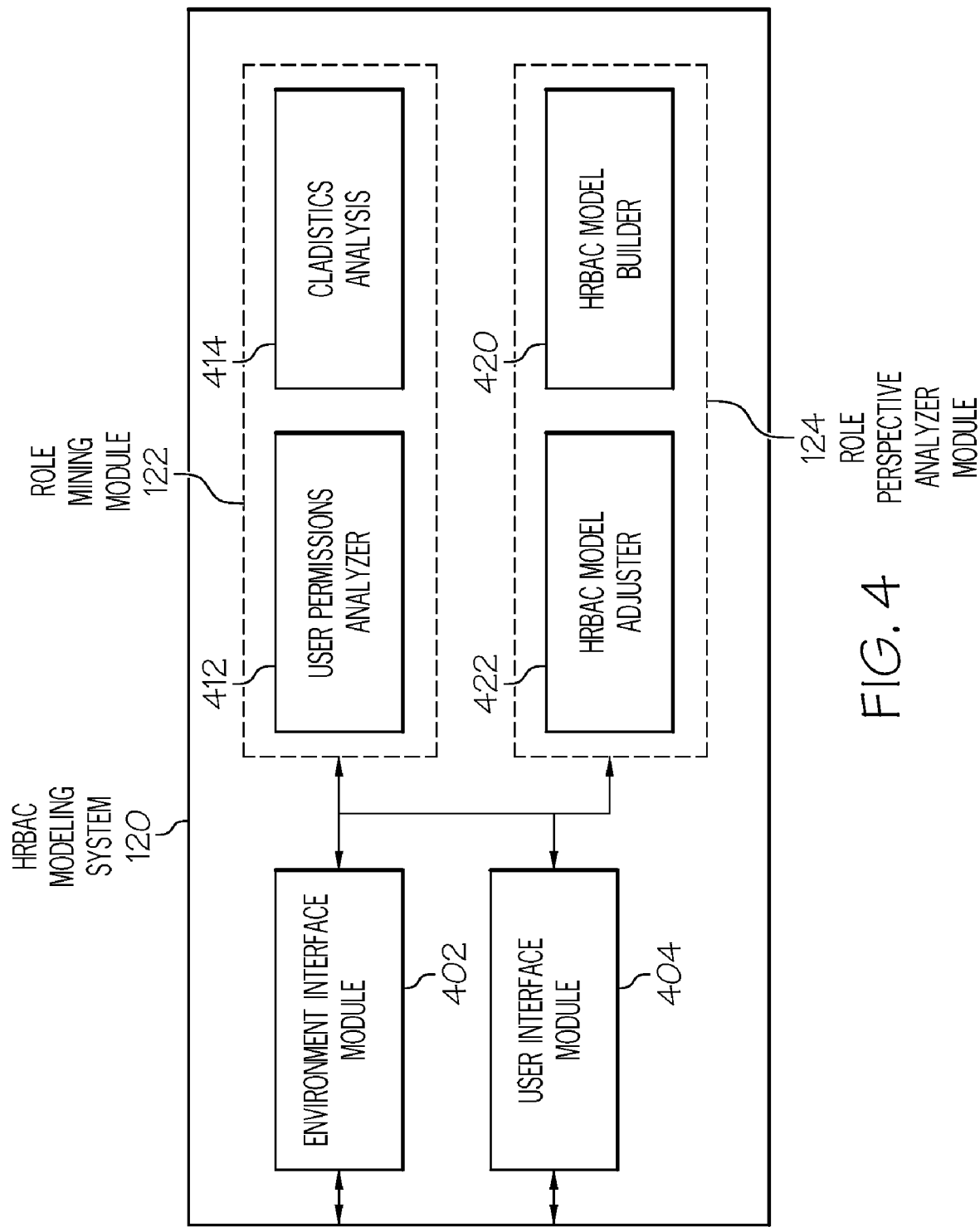
FIG. 4 depicts a conceptual illustration of software components of an HRBAC modeling system according to some embodiments.

FIG. 4 depicts a conceptual illustration of software components of an HRBAC modeling system 120 according to some embodiments. As described previously (and in more detail in relation to FIGS. 5-6), the HRBAC modeling system 120 may generate an RBAC model (including an HRBAC model) for a particular organizational environment 101, 201. The HRBAC modeling system 120 may include an environment interface module 402 and a user interface module 404 in addition to the role mining module 122 and role perspective analyzer module 124. The environment interface module 402 may facilitate communication to and from components of the organizational environment 101 such as the access control 110. The environment interface module 402 may, for example, transmit a generated RBAC model to the organizational environment 101 for implementation by an access control module 110. The environment interface module 402 may also, for example, receive indications of permissions granted to users of the organizational environment 101 as well as information about those users. The user interface module 404 may facilitate communication to and from a user of the HRBAC modeling system 120, such as from an administrator entering information, setting up an RBAC modeling session, requesting modifications to the cladistics analysis results, or other tasks.

The role mining module 122 of HRBAC modeling system 120 may analyze the permissions granted to users in the organizational environment 101 to create permission characteristics and may also perform cladistics analysis on the permission characteristics to determine role perspective relationships between individual users of the organizational environment 101, as described previously. The role mining module 122 may include submodules such as a user permissions analyzer 412 and cladistics analysis module 314 to assist it in performing its tasks. The user permissions analyzer 412 may create the permission characteristics based on the permissions granted to users in the organizational environment 101. In some embodiments, the user permissions analyzer 412 may create the permission characteristics from the user permissions by analyzing granted permissions to determine which permissions should be made into permission characteristics. Some permissions, for example, may not be considered important to a cladistics analysis and thus need not be converted into permission characteristics. The conversion of permissions to permission characteristics may be varied based on client preference, the particular organization environment 101, or any other factor.

The cladistics analysis sub-module 414 may perform cladistics analysis on the permission characteristics created by the user permissions analyzer 412. To perform the analysis, the cladistics analysis sub-module 414 may perform a cladistics analysis with the permission characteristics serving as characteristics in a Bayesian analysis of common factors. Cladistics is a branch of biology that determines evolutionary relationships between organisms based on derived similarities (of characteristics). The end result of cladistics analysis is typically a 'cladogram', which is a relationship diagram that shows different hypotheses of relationships. In a classic cladogram, the relationship between any two organisms is clearly indicated based on their proximity on the vertical axis of the cladogram and the distance form each to the nearest common branch. On a cladogram based on roles, the relationship between different roles on the cladogram similarly provides an indication of their commonalities. For example, the closer two roles appear on a cladogram the more closely related they are likely to be. The cladistics analysis sub-module 414 may generate a cladogram for the users of the organizational environment 101 based on the determined role perspective relationships. The generated cladogram would show the relationship between different roles (i.e., how closely they are related) based on the permissions granted to users of the organizational environment 101.

The role perspective analyzer module 124 of the HRBAC modeling system 120 may use the determined role perspective relationships to generate an RBAC model, which may then be provided to the access control module 110 of the organizational environment 101 for use in an RBAC system. The role perspective analyzer module 124 may include submodules such as an HRBAC model builder 420 and an HRBAC model adjuster 422 to assist it in performing its tasks. The HRBAC model builder 420 may generate the RBAC model based on the determined role perspective relationships. The generated model may thus be fitted to the current working model of the organizational environment 101. The HRBAC model adjuster 422 may receive an indication of one of more modifications to the determined role perspective relationships and to modify the role perspective relationships in response.

The generated RBAC model may be fitted to the current working environment of the organization as it is created from the current user permissions of the organizational environment 101. The use of a cladistics analysis by the role mining module 122 may greatly reduce the time and resources required to determine role perspective relationships and thus a model of the roles in an organization and may largely eliminate the need to manually analyze large tables of data. A review of the resulting relationships may also result in insights into the functionality of the organization for which the RBAC model was created which can result in a valuable perspective on potential business functional improvements.

FIG. 4 depicts an example of a flow chart 500 for generating an HRBAC model according to some embodiments. The method of flow chart 500 may be performed, in one embodiment, by components of an HRBAC modeling system 120. Flow chart 500 begins with optional element 502, where the environment interface module 402 or the user interface module 404 receives a request to generate an HRBAC model for a particular organizational environment 101. At element 504, the environment interface module 402 may access the permissions granted to users of the organizational environment 101 for which the HRBAC model is to be created, such as by receiving an indication of the granted permissions from the organizational environment 101.

The role mining module 122 (and its user permissions analyzer 412) may, at element 406, analyze the permissions to create permission characteristics for use in the cladistics analysis. At element 508, the cladistics analysis sub-module 414 of the role mining module 122 may perform cladistics analysis on the permission characteristics, as described previously. The cladistics analysis sub-module 414 may at element 510 determine the role perspective relationships between individual users of the organizational environment 101 based on the results of the cladistics analysis at element 508. The determined role perspective relationships between individual users of the organizational environment 101 may illustrate the relationship between different roles. The cladistics analysis sub-module 414 may also at element 512 generate a cladogram based on the role perspective relationships to help illustrate the role perspective relationships. The common branches of the cladogram may be representative of the actual roles assigned to the individual users and may be used to build an HRBAC model fitted to the current working environment of the organization. As described previously, the relationship between two roles may be indicated on the cladogram based on the proximity on the vertical axis (where closer proximity indicates closer relationship) and the distance from each to the nearest common branch (where closer on the 'tree' indicates closer in relationship).

In some embodiments, the HRBAC model adjuster 422 of the role perspective analyzer module 124 may determine at decision block 514 whether the determined role perspective relationships should be modified and, if the determination is made to make the modification, the HRBAC model adjuster 422 may modify the cladogram and/or the role perspective relationships at element 516. The HRBAC model adjuster 422 may make such determination in response to a request from an administrator or other user in some embodiments. In other embodiments, the HRBAC model adjuster 422 may utilize an automated routine to make the determination of whether role perspective relationships should be modified. A user may desire for the determined role perspective relationships for a variety of reasons. For example, a user may view the cladogram and decide that a new role should be defined as there are a number of users that have particular permissions in common but there is no current defined role for that set of permissions. In another example, a user may determine that the Project Manager role and the Project coordinator role have the same permissions and thus both roles are not necessary (and they can be collapsed into one role). In yet another example, particular roles may be negatively impacting the performance of the role perspective relationship determination and the overall model may be improved by removing those roles from the analysis. One of ordinary skill in the art will recognize that any type of modification or adjustment may be made by the HRBAC model adjuster 422. The HRBAC model adjuster 422 may therefore provide the ability to override the generated role perspective relationships and the resulting cladogram.

After any modifications are made, the HRBAC model builder 420 of the role perspective analyzer module 124 may at element 518 generate the HRBAC model based on the determine role perspective relationships (as modified) between individual users of the organizational environment. The role perspective analyzer module 124 may at element 520 provide the generated HRBAC model to an access control module 110 of the organizational environment 101, after which the method terminates.

Figure 6:
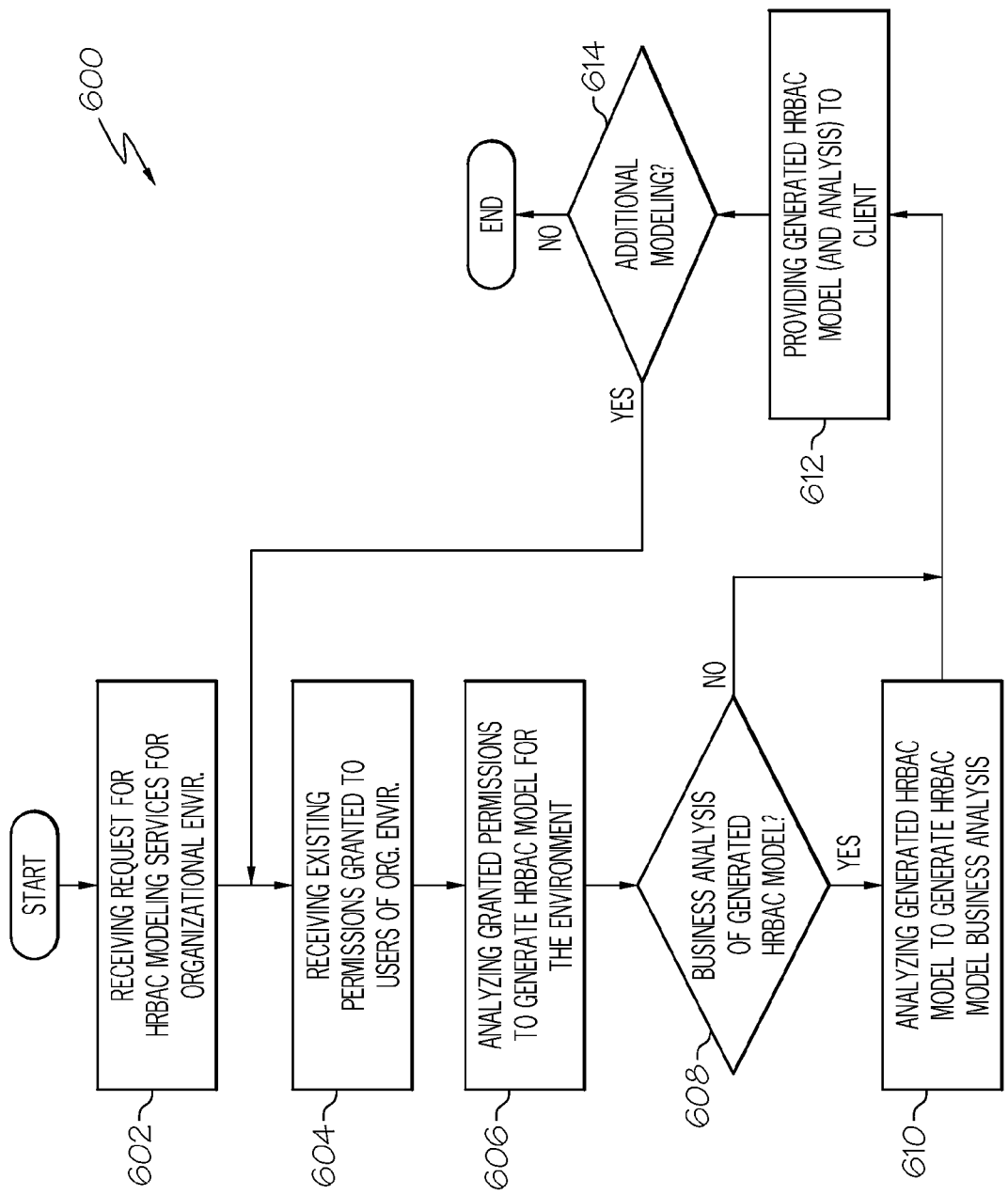
FIG. 6 depicts an example of a flow chart for providing an HRBAC modeling service according to some embodiments.

FIG. 6 depicts an example of a flow chart 600 for providing an HRBAC modeling service according to some embodiments. The method of flow chart 600 may be performed, in one embodiment, by components of an HRBAC modeling system 120. Flow chart 600 begins with optional element 602, where the environment interface module 402 or the user interface module 404 receives a request to provide HRBAC modeling services for a particular organizational environment 101. At element 604, the environment interface module 402 may receive the permissions granted to users of the organizational environment 101 for which the HRBAC model is to be created, such as by receiving an indication of the granted permissions from the organizational environment 101 as part of the request for HRBAC modeling services or by accessing such information directly.

Figure 5:
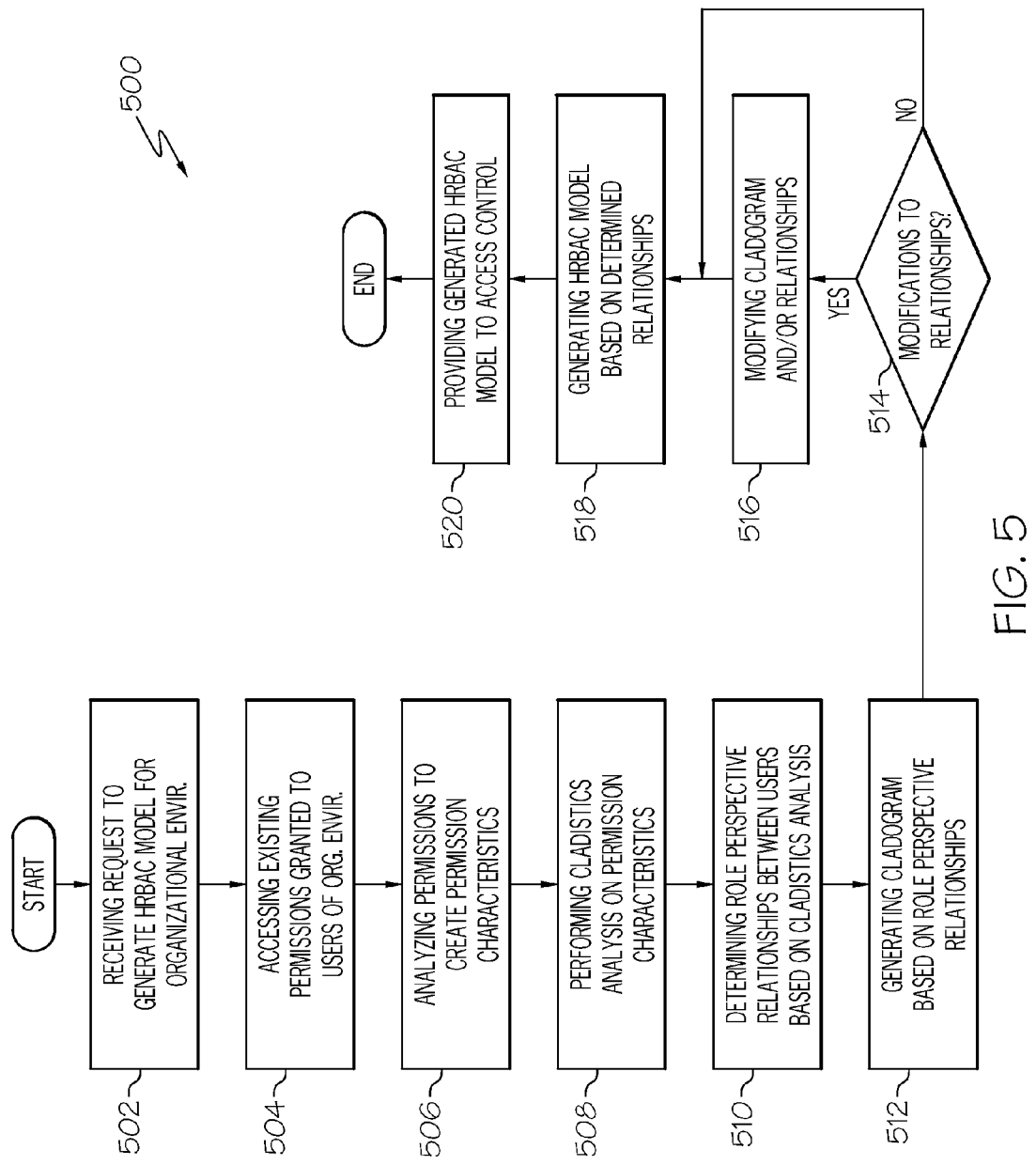
FIG. 5 depicts an example of a flow chart for generating an HRBAC model according to some embodiments.

At element 606, the HRBAC modeling system 120 may analyze the granted permissions to generate an HRBAC model for the organizational environment 101, as described in more detail in relation to FIG. 5. The HRBAC modeling system 120 may determine at decision block 608 whether the client of the HRBAC modeling services desires a business analysis of the generated HRBAC model. If a business analysis is desired, the HRBAC modeling system 120 may at element 610 analyze the generated HRBAC model to generate the HRBAC model business analysis. To accomplish this, the role perspective relationships of the generated HRBAC model may be analyzed. The analysis may be accomplished by a business analyst or other user, the HRBAC modeling system 120, or a combination of the two. The business analysis may include any kind of insight, conclusion, recommendation, or other information that relates to the client's organization or organizational environment 101. Example business analysis contents may include recommendation to add or remove roles, add or remove job titles, add or remove employees or groups to streamline the organization and reduce duplication, combine the functionality of two groups into one, add or remove permissions from particular roles, compare the client with other clients, or any other type of information.

The business analysis contents may provide an effective business tool that allows for a deep and unique analysis of relationships between roles and individuals in an organization. The generated HRBAC model for a particular organization may indicate areas for significant improvements and efficiencies. The resulting business analysis contents may also provide for numerical results that provide additional information and credibility to the analysis results. An example of business analysis contents may provide further insight into their value. In this example, the generated HRBAC model for a particular organization indicates that the accounting group has 20 employees with a variety of access permissions. If, in this example, 15 of the employees have access to a particular resource, the resource is likely one that should be associated with the accounting group role. By creating such a role and assigning members of the group to that role, changes in personnel can be accounted for more easily and the remaining 5 employees that formerly did not have access to the resource may now have access, potentially improving their productivity. In this example, 8 of the employees may have access to a particular computer director and, upon further analysis, each of the 8 employees is a member of a committee associated with that computer directory. Using this insight from the model, a role for committee members may be created to facilitate proper access to the committee directory. Numerical results may also be provided in the analysis, such as by stating that there is a particular likelihood that a particular permission is associated with the recommended role (e.g., there is an 82% chance that the permission held by 15 out of 20 employees should be held by all 20).

In a different example, an analysis of the generated HRBAC model may indicate that 200 employees in an organization perform the same task on a resource and these employees are spread over three separate groups. The business analysis contents may then recommend that these three groups be combined into one, potentially resulting in significant efficiencies in personnel and management resources. One of ordinary skill in the art will recognize that the business analysis may contain a variety of recommendations limited only by the type of organization, and that these business analyses may facilitate insights and raise questions that would likely not occur absent such an analysis of the generated HRBAC model.

After any modifications are made, the HRBAC modeling system 120 may at element 612 provide the generated HRBAC model and requested business analysis to the client. At decision block 614, HRBAC modeling system 120 may determine whether additional modeling services have been requested by the client, and, if additional HRBAC modeling services are desired, the method of flow chart 600 may return to element 604 for continued processing. A client may, for example, request a one-time HRBAC model be provided with no follow-up, in which case the method may simply terminate. In other embodiments, a client may request additional HRBAC modeling services, such as ones that are repeated at fixed intervals, after organizational events, or other methodology. By repeating the HRBAC modeling at regular intervals, a client may help ensure that its HRBAC model provides a reasonably accurate representation of the current working environment. Additional HRBAC modeling may, for example, account for new or removed roles, different permissions, organization restructuring, etc. The system and methodology of the disclosed embodiments provides an effective mechanism in providing an ongoing HRBAC modeling service.

It will be apparent to those skilled in the art having the benefit of this disclosure that the present invention contemplates methods, systems, and media for automatically generating an RBAC model for an organizational environment. It is understood that the form of the invention shown and described in the detailed description and the drawings are to be taken merely as examples. It is intended that the following claims be interpreted broadly to embrace all the variations of the example embodiments disclosed.

What is claimed is:

1. A method for generating a role based access control model, the method comprising:
   accessing existing permissions granted to users in an organizational environment;
   analyzing the permissions to create permission characteristics;
   performing cladistics analysis on the permission characteristics to determine role perspective relationships between individual users of the organizational environment; and
   generating a role based access control model for the organizational environment based on the determined role perspective relationships between individual users of the organizational environment.

2. The method of claim 1, further comprising receiving a request to generate the role based access control model for the organizational environment.

3. The method of claim 1, further comprising providing the generated role based access control model to an access control module of the organizational environment.

4. The method of claim 1, wherein the role based access control model is a hierarchical role based access control model.

5. The method of claim 1, wherein generating a role based access control model comprises generating a cladogram based on the determined role perspective relationships.

6. The method of claim 1, wherein generating a role based access control model comprises receiving an indication of one or more modifications to the determined role perspective relationships.

7. A computer program product comprising a computer-useable medium having a computer readable program, wherein the computer readable program when executed on a computer causes the computer to:
   accessing existing permissions granted to users in an organizational environment;
   analyzing the permissions to create permission characteristics;
   performing cladistics analysis on the permission characteristics to determine role perspective relationships between individual users of the organizational environment; and
   generating a role based access control model for the organizational environment based on the determined role perspective relationships between individual users of the organizational environment.

8. The computer program product of claim 7, further comprising receiving a request to generate the role based access control model for the organizational environment.

9. The computer program product of claim 7, further comprising providing the generated role based access control model to an access control module of the organizational environment.

10. The computer program product of claim 7, wherein the role based access control model is a hierarchical role based access control model.

11. The computer program product of claim 7, wherein generating a role based access control model comprises generating a cladogram based on the determined role perspective relationships.

12. The computer program product of claim 7, wherein generating a role based access control model comprises receiving an indication of one or more modifications to the determined role perspective relationships.

13. A hierarchical role based access control (HRBAC) modeling system, the system comprising:
   an environment interface module to receive an indication of existing permissions granted to users in an organizational environment;
   a role mining module in communication with the environment interface module to analyze the permissions to create permission characteristics and to perform cladistics analysis on the permission characteristics to determine role perspective relationships between individual users of the organizational environment; and
   a role perspective analyzer module in communication with the role mining module to generate a role based access control model based on the determined role perspective relationships.

14. The system of claim 13, further comprising a user interface module to receive input from an administrator.

15. The system of claim 13, wherein the role mining module further comprises a cladistics analysis sub-module to generate a cladogram for the users of the organizational environment based on the determined role perspective relationships.

16. The system of claim 13, wherein the role perspective analyzer module further comprises a HRBAC model builder to receive an indication of one or more modifications to the determined role perspective relationships and to modify the role perspective relationships in response.

17. A method for providing a hierarchical role based access control (HRBAC) model service to a client, the method comprising:
   receiving an indication of existing permissions granted to users of an organizational environment of the client;
   analyzing the permissions to create permission characteristics;
   performing cladistics analysis on the permission characteristics and generating an HRBAC model specifying role perspective relationships between individual users of the client organizational environment; and
   providing the generated HRBAC model to the client.

18. The method of claim 17, further comprising receiving a request from the client to provide an HRBAC model for the organizational environment of the client.

19. The method of claim 17, further comprising analyzing the role perspective relationships of the generated HRBAC model to generate an HRBAC model business analysis.

20. The method of claim 17, further comprising performing an ongoing HRBAC model service to the client by receiving updates to permissions granted to users of the client organizational environment and generating revised HRBAC models in response.

* * * * *